United States Patent
Hirai

(10) Patent No.: US 7,382,715 B2
(45) Date of Patent: Jun. 3, 2008

(54) OPTICAL RECORDING MEDIUM HAVING RELATIONSHIP BETWEEN PIT DEPTHS, WAVELENGTH AND REFRACTIVE INDEX

(75) Inventor: Hideaki Hirai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 153 days.

(21) Appl. No.: 10/537,830

(22) PCT Filed: Feb. 20, 2004

(86) PCT No.: PCT/JP2004/002046

§ 371 (c)(1),
(2), (4) Date: Jun. 8, 2005

(87) PCT Pub. No.: WO2004/074908

PCT Pub. Date: Sep. 2, 2004

(65) Prior Publication Data

US 2006/0013119 A1    Jan. 19, 2006

(30) Foreign Application Priority Data

Feb. 24, 2003 (JP) ............... 2003-046417
Sep. 30, 2003 (JP) ............... 2003-339564

(51) Int. Cl.
*G11B 7/24* (2006.01)
(52) U.S. Cl. ............... 369/275.4; 369/275.1
(58) Field of Classification Search ............... None
See application file for complete search history.

(56) References Cited

U.S. PATENT DOCUMENTS

| | | | | |
|---|---|---|---|---|
| 5,410,534 A | * | 4/1995 | Nagata et al. ............ | 369/275.4 |
| 5,602,825 A | | 2/1997 | Sugaya et al. | |
| 5,757,763 A | | 5/1998 | Green, Jr. et al. | |
| 5,926,446 A | * | 7/1999 | Shimizu ................ | 369/275.4 |
| 5,946,287 A | * | 8/1999 | Nakayama et al. ......... | 369/275.4 |
| 6,175,548 B1 | * | 1/2001 | Kashiwagi ............... | 369/275.1 |
| 6,678,236 B1 | * | 1/2004 | Ueki ................... | 369/275.3 |
| 6,762,989 B2 | * | 7/2004 | Hirokane et al. ......... | 369/275.4 |
| 6,906,994 B2 | * | 6/2005 | Lee et al. .............. | 369/275.4 |
| 6,930,977 B1 | * | 8/2005 | Kondo et al. ............ | 369/275.4 |
| 6,965,556 B1 | * | 11/2005 | Kikukawa et al. ......... | 369/275.4 |
| 7,050,383 B2 | * | 5/2006 | Nakajima et al. ......... | 369/275.3 |
| 2002/0027843 A1 | | 3/2002 | Kim et al. | |

FOREIGN PATENT DOCUMENTS

CN    1300054    6/2001

(Continued)

OTHER PUBLICATIONS

Hiroshi Ogawa, "Next Generation Optical Disc" Proceedings of the ISOM, pp. 6-7, 2001.

*Primary Examiner*—Tan Dinh
(74) *Attorney, Agent, or Firm*—Dickstein Shapiro LLP

(57) ABSTRACT

A medium for optical recording is disclosed, from which recorded information is reproduced by a laser beam. The medium includes a disk board having a recording surface, and multiple pits in the recording surface. The pits are included in cells having equal size and varying pit-occupancy rates dependent on the recording information, the pit-occupancy rate being the ratio of area of the pit to area of the corresponding cell. The depths H of the pits, the wavelength $\lambda$ of the laser beam, and the refractive index n of the board are related as, $\lambda/6n < H < \lambda/4n$.

2 Claims, 15 Drawing Sheets

FOREIGN PATENT DOCUMENTS

| | | |
|---|---|---|
| CN | 1340811 A | 3/2002 |
| CN | 1372254 | 10/2002 |
| CN | 1300054 | 6/2006 |
| EP | 1 197 963 | 4/2002 |
| JP | 58-215735 | 12/1983 |
| JP | 4-30094 | 2/1992 |
| JP | 7-121881 | 5/1995 |
| JP | 2002-157734 | 5/2002 |
| JP | 2002/157734 A | 5/2002 |

* cited by examiner

PIT DEPTH 150 Å

PIT DEPTH 300 Å

PIT DEPTH 400 Å

PIT DEPTH 510 Å

PIT DEPTH 660 Å

PIT DEPTH 800 Å

PIT DEPTH 150Å

PIT DEPTH 300Å

PIT DEPTH 400Å

PIT DEPTH 510Å

PIT DEPTH 660Å

PIT DEPTH 800Å

FIG.20A  FIG.20B
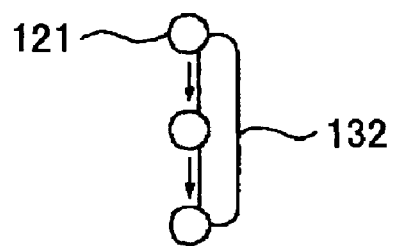
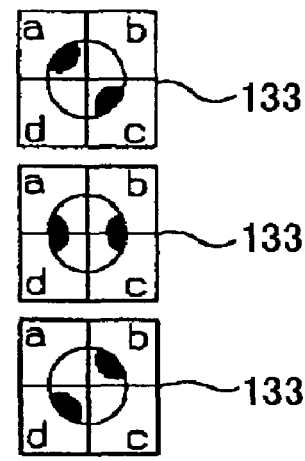
FIG.21
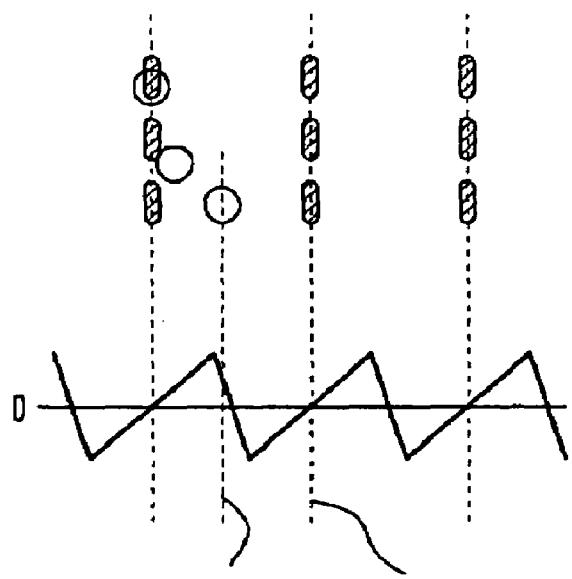
MIDDLE OF THE TRACK    RIGHT ABOVE THE TRACK (PIT SEQUENCE)

US 7,382,715 B2

OPTICAL RECORDING MEDIUM HAVING RELATIONSHIP BETWEEN PIT DEPTHS, WAVELENGTH AND REFRACTIVE INDEX

TECHNICAL FIELD

The present invention generally relates to optical recording media and apparatuses, and more particularly to a medium for optical recording and an apparatus for optical information processing.

BACKGROUND ART

In recent years and continuing, an optical-recording medium such as a Compact Disk (CD) with a recording capacity of 0.65 Gigabytes and a Digital Video Disk (DVD) with a recording capacity of 4.7 Gigabytes is becoming increasingly common as means for storing video information, voice information, or data on a computer. Moreover, at the present, there is an increasing demand for further improvement in recording density and for increased capacity.

As means for increasing the recording density of such optical-recording media, in an optical information processing apparatus which performs writing to or reading from the optical-recording media a set of information, increasing the Numerical Apeture (NA) of an objective lens or shortening the wavelength of an optical source so as to reduce the diameter of a light spot formed on the optical-recording media by light beams condensed by the objective lens is effective.

Thus, for example, while the Numerical Apeture of the objective lens is set as 0.50 and the wavelength of the optical source as 780 nm for a "CD-type optical-recording medium", the NA of the objective lens is set as 0.65 and the wavelength of the optical source as 660 nm for a "DVD-type optical-recording medium" with a greater recording density. Moreover, in order to respond to the demand for further improvement in the recording density and increased capacity, further increasing of the Numerical Apeture of the objective lens above 0.65, or further shortening of the wavelength of the optical source below 660 nm is called for. As for such large-capacity optical-recording media and optical information processing apparatuses, there are systems proposed which establish the need for achieving the increased capacity using an optical source in the blue-wavelength domain (refer to Non-Patent Document 1, for example.)

However, there is a problem in which, as the NA of the objective lens is increased, or the wavelength of the optical source is shortened, the margin for various changes in the optical-recording medium is reduced. For example, there is a problem in which a coma generated by a tilt in the optical-recording medium becomes large. Generating of the coma leads to a degrading of the beam spot formed on an information-recording surface in the optical-recording medium, preventing normal operations of recording and reproduction. The coma generated by the tilt in the optical recording medium is generally given by the equation below:

$$W^{31} = ((n^2-1)/(2n^3)) \times (d \times NA^3 \times \theta/\lambda)$$

Herein, n represents the refractive index of a transparent board in the optical recording medium, d the thickness of the transparent base board, NA the Numerical Apeture (NA) of the objective lens, λ the wavelength of the optical source, and θ the amount of the tilt. It may be understood from the equation that the shorter the wavelength and the higher the NA, the bigger the coma. Similarly, as a spherical aberration generated by a difference in the thickness of the board in the optical recording medium is proportional to the $4^{th}$ power of NA, the Numerical Apeture, and to the $(-1)^{th}$ power of λ, the wavelength, the shorter the wavelength and the higher the NA, the bigger the spherical aberration.

Thus, as another proposal, a multi-level recording and reproduction method of controlling the signal levels in pits formed on the optical recording medium is being proposed. In other words, in a related-art optical recording medium, reading of a signal is performed by using a change in the amount of light reflected dependent upon the presence or absence of pits when scanning over the optical recording medium with a laser light for reading. The multi-level recording and reproduction method, as described in Patent Document 1, which performs the reading of the signal by using the change in the amount of light reflected dependent upon a combination of pit depth and pit width; and the multi-level recording and reproduction method, as described in Patent Document 2, which performs the reading by using the change in the pit depth and the pit width, and an offset in the pit position, are also being proposed.

Furthermore, in Patent Document 3, concerning a method of recording multi-level information using a recording mark occupancy rate method, in a case of a concavo-convex-shaped phase pit, a setting of an optical-channel depth of the phase pit as λ/4 so as to make a signal gain of a Radio-frequency (Rf) signal maximal is described.

Patent Document 1
JP58-215735A
Patent Document 2
JP07-121881A
Patent Document 3
JP2002-157734A
Patent Document 4
JP04-030094A
Non-Patent Document 1
Hiroshi Ogawa, "Next Generation Optical Disc", Proceedings of the ISOM, pp. 6-7, 2001

However, as described in the Patent Documents 1 and 2, the efficiency of producing the optical recording medium in which multi-level data are recorded using the pit depth and the pit width becomes very low.

FIG. 14 and FIG. 15 illustrate a manufacturing process of a reproduction-only optical recording medium in which a binary signal comprising a low-level and a high-level is recorded in related-art CD-type and DVD-type pits. The known manufacturing process comprises the steps of laser cutting (S1), developing (S2), stamper production (S3), and replication (S4). In other words, first, as illustrated in FIG. 15A, using an optical beam 100, a portion to be the pit 1 on a resist surface 102 of a glass board 101 is exposed to the depth where the optical beam 100 falls upon the glass board 101, the developing is performed as illustrated in FIG. 15B, a stamper master 103 is produced based on the developed originally-recorded board as illustrated in FIG. 15C. Then, using the stamper master 103, according to a known replication process, reproduction-only optical recording media 104 are manufactured in large quantities. The number 105 represents a groove, while 106 represents a land.

In the related-art manufacturing process, there is a need to control exposure of the glass board 101 so as to comprise pits having a plurality of depths. However, in such a case, the bottom loses smoothness (surface curvature or surface roughness is produced). Moreover, it is empirically understood that there are problems such that a change in the depth is very sensitive to a change in the exposure so as to make the controlling difficult. While depth modulation is theoretically enabled by changing the exposure, due to such reasons, in a related-art optical recording medium for CD reproduction or a related-art optical recording medium for DVD reproduction, the exposing of the glass board so as to record the signal which corresponds to a pit-length modulation is not performed.

Moreover, as another problem to be solved by the present invention, there is a method of generating a tracking-error signal. In other words, the method of generating the tracking-error signal which has been adopted by the optical recording medium for CD reproduction and the optical recording medium for DVD reproduction is not suitable for such shortened wavelength, increased NA, increased density or speed using such methods as the multi-level recording method. Also it is a method by which it is difficult to achieve compatibility with a recording-type optical recording medium. In other words, a Differential Push-Pull method (referred to as the DPP method below) is applied to the optical recording medium for CD reproduction, while a Differential Phase-Detection method (referred to as the DPD method below) is applied to the optical recording medium for DVD reproduction. Below, the respective methods are described.

The Differential Push-Pull method (or the DPP method) is described. Generating the tracking-error signal by the DPP method comprises using a grating on a main track and its neighboring track, a main beam M1 spot, and first and second sub-beam S1 and S2 spots.

Referring to FIG. 16 which illustrates a related-art optical pickup (an optical element of an optical information processing apparatus), a beam output from a semiconductor laser 110 is collimated at a collimator lens 111 so as to be diffracted at a grating 112 for branching into zeroth-order and ± first-order diffracted lights. Then, such branched lights, at the object lens 113, are condensed so as to illuminate an optical recording medium 114. Then, as illustrated in FIG. 17, the main beam M1 spot comprising the zeroth-order diffracted light is formed over a main track T, and the first and the second subbeam S1 and S2 spots comprising the ± first-order diffracted lights, respectively, precede and follow relative to the main beam M1 spot so as to be formed in a radial direction of the optical recording medium 114 with a separation distance from each other of ±½ track pitch.

The main beam M1 and the first and the second subbeams S1 and S2 reflected at the optical recording medium 114 so as to be passed through the object lens 113 are deflected from the illuminated light beam at a beam splitter 115 so as to be received at receiving optics 117 via a detector lens 116. The receiving optics 117, as illustrated in FIG. 17, comprises a first optical detector 118a which receives the main beam M1, and a second optical detector 118b and a third optical detector and 118c which respectively receive the first and the second subbeams S1 and S2. Each of the first through third optical detectors 118a through 118c independently converts the beam photoelectrically, using two plates partitioned in the radial direction of the optical recording medium 114.

The signals detected at the first through third optical detectors 118a, 118b, and 118c are respectively input to first through third differential amplifiers 119, 120, and 121 so as to be output as first through third push-pull signals. A first amplifier 122 amplifies to a predetermined gain G1 the third push-pull signal, while a second amplifier 123 amplifies to a predetermined gain G2 a signal summing a signal output from the first amplifier 122 and the second push-pull signal. A fourth differential amplifier 124 takes the difference between a signal input from the second amplifier 123, and the first push-pull signal, based on the main beam M1, input from the first differential amplifier 119. Then, the gains G1 and G2 of the first and the second amplifiers 122 and 123 are determined by taking into account intensities of the main beam M1 and the first and the second beams S1 and S2.

While there is no particular problem in adopting the DPP method for the reproduction-type optical recording medium, in a case of adopting the method for operating the recording-type optical recording medium using the optical pickup apparatus having such configuration, problems as described below arise. In other words, as for the beam output from the optical source 110 diffracted at the grating 112 into three beams M1, S1, and S2 so as to be used, there are problems as follows:

(1) The optical efficiency of the main beam M1 decreases so as to make its use for recording difficult. Moreover, an application requiring increased speed becomes difficult.

(2) Moreover, at the time of the recording, a signal recorded on a neighboring track may be erased by the first and the second subbeams S1 and S2.

Next, the Differential Phase-Detection method (the DPD method) is described. In the DVD reproduction-type optical recording medium, a method called the Differential Phase-Detection method, or DPD method is adopted as a method for obtaining the tracking-error signal. This method uses a change, at the time a beam spot illuminating an optical recording medium passes over the pit, of an image (a diffraction pattern) of the pit on the receiving optics due to an offset, from the center of the pit, of the beam spot, the receiving optics being arranged so as to comprise areas, partitioned in the longitudinal direction of the track, of the image of the pit. The way of changing the output signal level, in response to the amount of light received at the respective areas, differs depending upon the direction and magnitude of the offset, from the center of the pit, of the beam spot. The tracking-error signal indicating the direction and the magnitude of the offset of the beam spot is obtained by binarizing the output of the receiving optics to predetermined levels so as to compare the phases of the binarized signal, and to examine which changed earlier and the time difference (phase difference) of the changing in the level.

FIG. 18A through FIG. 20B illustrate variations of distribution patterns (far-field images) of intensities of the amount of light reflected, received at the optical receiving areas a, b, c, and d of the quad-partitioned receiving optical sensors 133 at the time a beam spot 121 passes over information pits 132, a set of FIG. 18A, FIG. 19A, and FIG. 20A and a set of FIG. 18B, FIG. 19B, and FIG. 20B respectively representing the positional relationships between the beam spot 121 and the information pits 132, and the far-field images of the amount of light reflected when the beam spot 121 passes over the information pits 132. At the time the beam spot 121 is over an information track of the recording medium, the far-field image is in even brightness. In a case of the beam spot 121 passing over the center of the information pits 132, as illustrated in FIG. 19A and FIG. 19B, the far-field image changes while keeping bilateral symmetry. Moreover, as illustrated in FIG. 18A, FIG. 18B, FIG. 20A, and FIG. 20B, in a case of the beam spot 121 passing over with an offset from the center of the information pits 132, the bilateral symmetry in the far-field image is lost, causing the time difference (the phase difference) in the way of the change, and in a case of the beam spot 121 passing over the right-hand side of the center of the information pits 132, as illustrated in FIG. 18B, changing so as to rotate clockwise, while conversely in a case of the beam spot 121 passing over the left-hand side of the center of the information pits 132, as illustrated in FIG. 20B, changing so as to rotate counterclockwise. Such changes in the pattern become clearer with the beam spot 121 comprising the offset from the center of the information pits 132. Hereby, performing a conversion of the amount of light to an electrical signal so as to detect the time difference makes it possible to obtain the tracking-error signal as illustrated in FIG. 21.

By subtracting the tracking-error signal, as in FIG. 18A through FIG. 20B from the sum of the output signal levels corresponding to the amounts of reflected light received at the optical receiving areas a, b, c, and d, positioned diagonally from one another, of the quad-partitioned optical receiving sensors 133, the difference among the signal levels as described above becomes zero, representing a state referred to as an on-track state in which the beam spot 121 is right above the track. On the other hand, as the beam spot 121 is separated from the information pits, in response to the amount of light, the symmetry of the distribution of the intensities in the far-field image is lost so that the tracking-error signal is generated.

However, in a large-capacity optical recording medium where the beam diameter is greater than the pit diameter, in a case such that multiple edges exist in a beam (referring to FIG. 6A), the DPD method can not be used as multiple diffraction patterns mix with one another.

Moreover, while the DPD method is used for the DVD reproduction-type medium, for a DVD recording-type optical recording medium, the DPP method and a push-pull method are used so that there is a need to switch, between the recording-type and the reproduction-type, the method of generating the tracking-error signal.

Furthermore, in a case of using the recording mark occupancy rate method as described in Patent Document 3, as the optical-channel depth of the phase pit is set to be $\lambda/4$, obtaining the push-pull signal is almost impossible so as not to be able to apply the push-pull method in detecting the tracking-error signal.

DISCLOSURE OF THE INVENTION

Accordingly, it is a general object of the present invention to provide an optical recording medium and an optical information processing apparatus that substantially obviate one or more problems caused by the limitations and disadvantages of the related art.

It is a more particular object of the present invention to provide a reproduction-type optical recording medium in which multi-level information is recorded, enabling ease in production, as well as to ensure, for the reproduction-type optical recording medium, ease in compatibility of the tracking-error signal with a recording-type optical recording medium.

It is another more particular object of the present invention to enable the application, to a reproduction-type optical recording medium with an enlarged capacity (or with smaller-sized pits), of an easy method for generating a tracking-error signal.

It is another particular object of the present invention to enable the application of a method for generating a track-error signal without having such problems in a recording-type optical recording medium as a reduction of the amount of light or cross-erasing an adjacent track.

According to the invention, in a medium for optical recording, from which recorded information is reproduced by a laser beam, including a disk board having a recording surface, and multiple pits in the recording surface, the pits are included in corresponding cells each having equal size and varying pit-occupancy rates dependent on the recording information, the pit-occupancy rate being the ratio of the areas of the pits to the area of the corresponding cell, wherein depths H of the pits, a wavelength $\lambda$ of the laser beam, and a refractive index n of the board are related as, $\lambda/6n < H < \lambda/4n$.

A medium for optical recording in an embodiment of the invention enables the maintenance of a stable developing process which performs an exposure on the glass board so as to provide a reproduction-type optical recording medium in which multi-level information is recorded, which is easy to produce by partitioning an area comprising the pits into multiple cells having areas equal to one another, so as to include per cell one area-modulated pit in which reproduced signals having multiple levels dependent upon the pit occupancy rate relative to the respective cells are generated, as the multi-level information is recorded not by depth modulation, but rather by area modulation. Then, detection of the tracking-error signal also in a reproduction-type optical recording medium comprising pits using a push-pull method generally used in a recording-type medium is enabled so as to achieve compatibility with generating a tracking-error signal in a recording-type optical recording medium by setting pit depth within a range from $\lambda/6n$ where the push-pull amplitude is maximal to $\lambda/4n$ where amplitude differences among the respective pit sizes of the reproduced signals are maximal, or signal-to-noise ratio of the reproduced signals is maximal, especially as the intermediate value of the range.

According to another aspect of the invention, an apparatus for optical information processing includes an illumination optical system, a receiving optical system which optically receives light reflected from the medium for optical recording, and a signal-processing section which performs, based on signals detected which are optically received at the receiving optical system, a processing of the signals, wherein the receiving optical system comprises at least a pair of first receiving optical sections arranged symmetrically in a radial direction of the medium for optical recording within an area in a far-field in which a zeroth-order light reflected and ± first-order diffracted lights reflected from the pits overlap, and the signal-processing section detects a tracking-error signal, based on differences among the at least the pair of first receiving sections of the signals detected at the first receiving optical sections, using a push-pull method.

An apparatus for optical information processing in an embodiment of the invention enables the detection of a tracking-error signal also in an optical recording medium including the pits as described above using a push-pull method generally used in a recording-type optical recording medium so as to achieve compatibility with generating the tracking-error signal in a recording-type optical recording medium as well as resolving a problem of the DPD method, as observing the edges between the pits in the motion direction of the beam spot is not needed, and such problems as optical efficiency and cross-erasing, because of one-beam tracking as described above.

BRIEF DESCRIPTION OF THE DRAWINGS

Other objects, features, and advantages of the present invention will become more apparent from the following detailed descriptions when read in conjunction with the accompanying drawings, in which:

FIG. 20A and FIG. 20B are additional explanatory drawings which further illustrate the beam spot and the optical receiving states so as to describe the related-art DPD method; and FIG. 21 is an explanatory drawing which illustrates obtaining the tracking-error signal.

BEST MODE FOR CARRYING OUT THE INVENTION

Descriptions are given next, with reference to the accompanying drawings, of embodiments of the present invention.

The present invention is not limited to the specifically disclosed embodiments, but variations and modifications may be made without departing from the scope of the present invention.

A first embodiment of the present invention is described based on FIG. 1 through FIG. 9. The present embodiment basically relates to a reproduction-type optical recording medium in which a reproduced signal is generated from the amount of light reflected of a laser light illuminating pits. The structure in an area comprising pits is partitioned into multiple cells having equal areas, and an area-modulated pit, which generates reproduced signals having multiple levels dependent upon pit occupancy rates for the respective cells, is comprised per cell.

Figure 1:
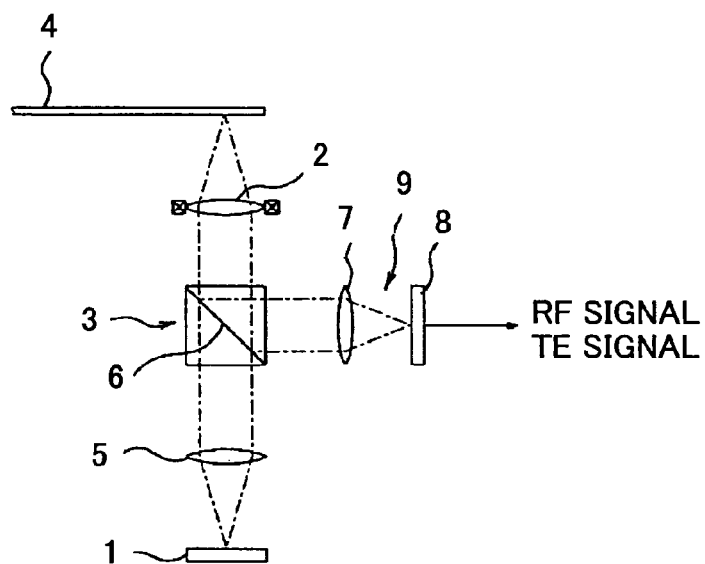
FIG. 1 is a schematic diagram of an optical-pickup apparatus according to a first embodiment of the present invention.

In order to prove the viability of such a reproduction-type optical recording medium, a validation was performed. The optical recording medium 4 has various pit depths and pit diameters at a track pitch of 0.43 μm. As schematically illustrated in FIG. 1, an optical pickup apparatus comprising an illumination optical system 3 has an optical source 1 which generates a laser beam with a wavelength of 400 nm and an object lens 2 having a NA of 0.65. Herein, 5 represents a collimated lens which collimates the laser beams, 6 a beam splitter which passes illuminating light and deflects returned light, and 7 a detecting lens which collects the deflected light reflected to an optical detector 8, comprising together a receiving optical system 9. Furthermore, as a method of detecting a tracking-error signal, a push-pull method generally adopted to a recording-type optical recording medium is used.

Figure 2:
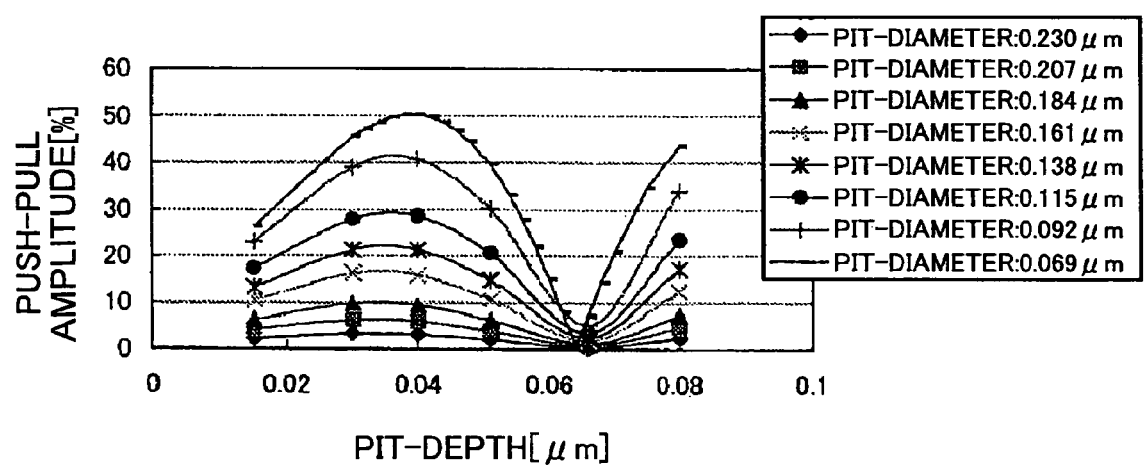
FIG. 2 is a graph which illustrates relationships among pit depths, pit diameters, and push-pull signal amplitudes.
Figure 3A:
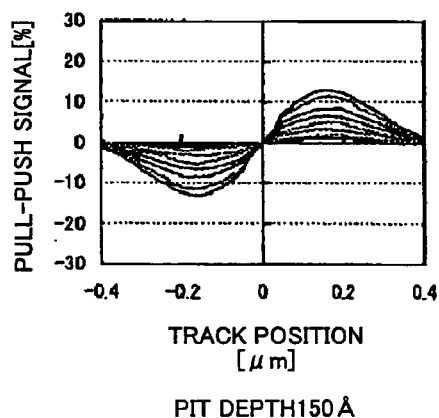
FIG. 3A through FIG. 3F are characteristic diagrams of the push-pull signals for the different pit depths.
Figure 3B:
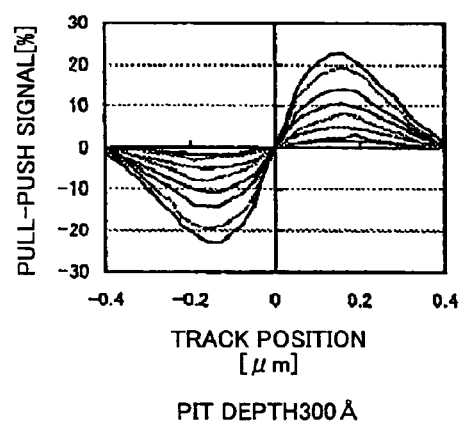
Figure 3C:
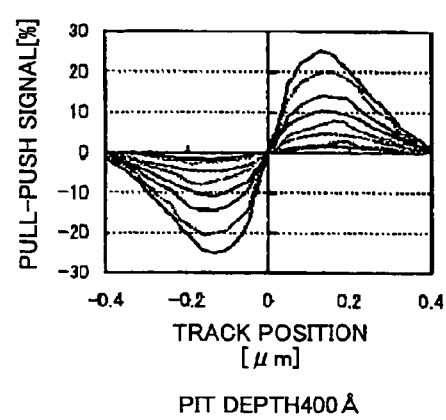
Figure 3D:
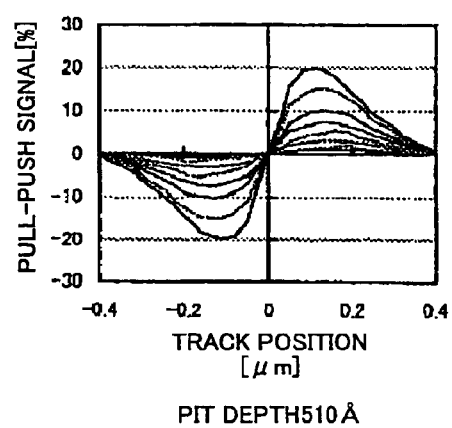
Figure 3E:
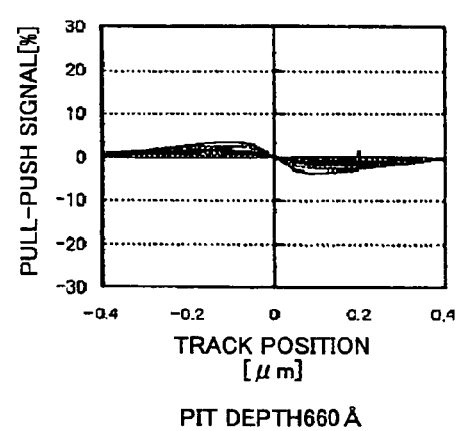
Figure 3F:
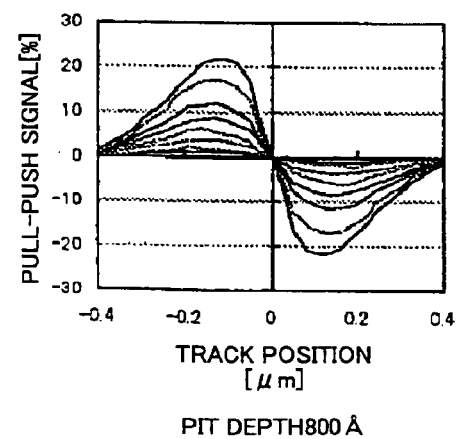

A result of the validation is described. First, FIG. 2 illustrates relationships among pit depths, pit diameters, and push-pull signal amplitudes, the horizontal axis representing the pit depths and the vertical axis representing the push-pull signal amplitudes, plotting multiple curves for different pit diameters. The push-pull signal amplitudes as illustrated in FIG. 2 are results obtained from push-pull signal characteristics as illustrated in FIG. 3A through 3F. FIG. 3A through 3F correspond to the push-pull signal characteristics for the respective pit depths of 150 Å, 300 Å, 400 Å, 510 Å, 660 Å, and 800 Å, and, furthermore, multiple curves for the different pit diameters are plotted in FIG. 3A through 3F. Every one of FIG. 3A through FIG. 3F illustrates cases of pit diameters of 0.230 μm, 0.207 μm, 0.184 μm, 0.161 μm, 0.138 μm, 0.115 μm, 0.092 μm, and 0.069 μm in descending order of the push-pull signal amplitude.

Assuming that the maximum level of the curves of FIG. 3A through 3F is $PP_{max}$, and the minimum level $PP_{min}$, the Push-Pull amplitude (PP) may be represented as PP= $(PP_{max}-PP_{min})$. The push-pull signal amplitude reaches the maximum with the pit depth of 0.04 μm (or approximately $\lambda/6n$) and the pit diameter of 0.069 μm, and the minimum at the pit depth of 0.064 μm (or approximately $\lambda/4n$) and the pit diameter of 0.023 μm.

Figure 4:
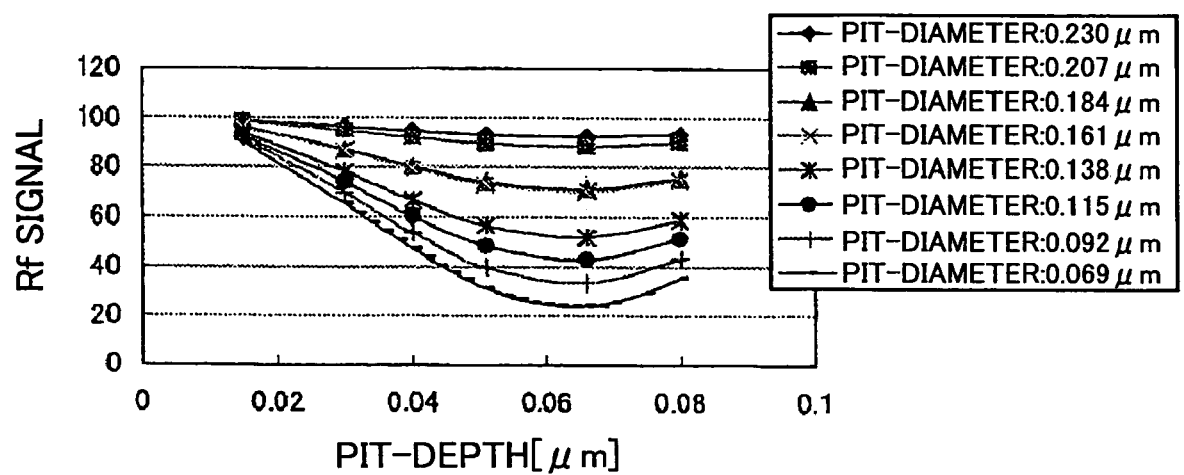
FIG. 4 is a graph which illustrates relationships among the pit depths, the pit diameters, and reproduced signals (Rf signals)
Figure 5A:
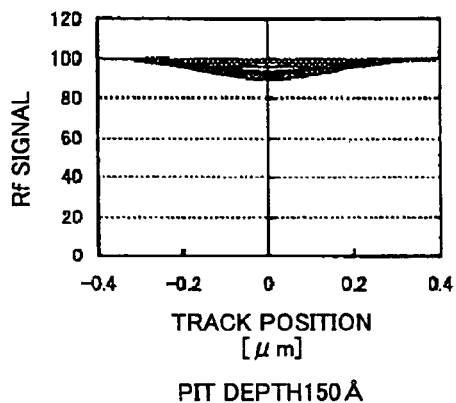
FIG. 5A through FIG. 5F are graphs of the Rf signals for the different pit depths.
Figure 5B:
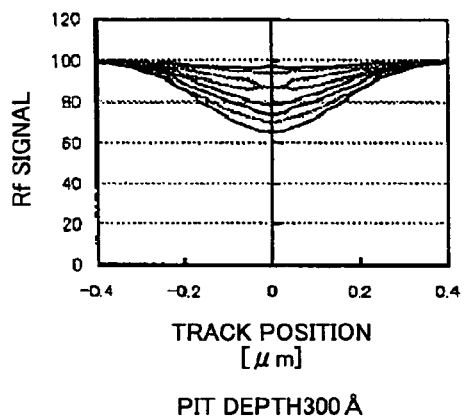
Figure 5C:
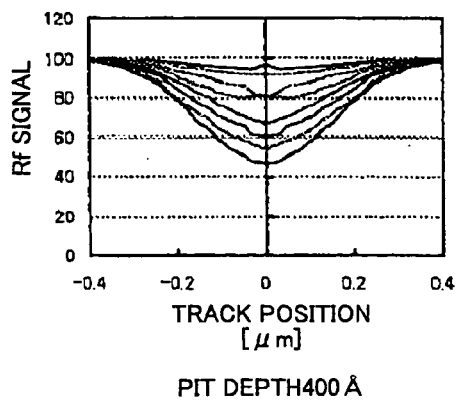
Figure 5D:
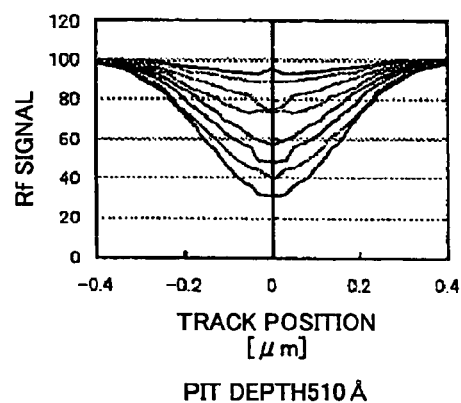
Figure 5E:
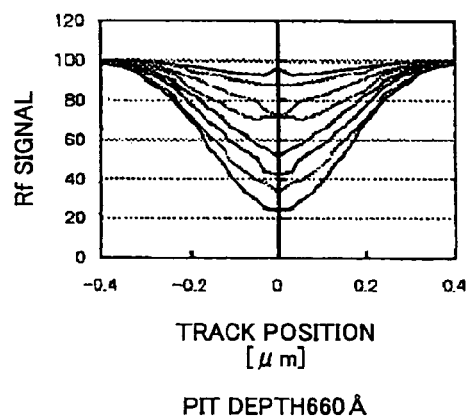
Figure 5F:
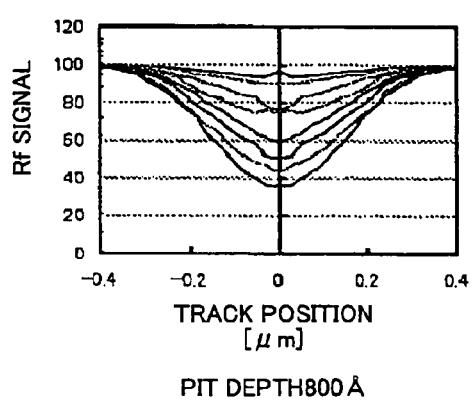

Moreover, FIG. 4 illustrates relationships among the pit depths, the pit diameters, and reproduced signals (Rf signals), the horizontal axis representing the pit depths and the vertical the Rf signals at an on-track timing, plotting multiple curves corresponding to the different pit diameters. Furthermore, the relationships between the Rf signals as illustrated in FIG. 4 and track positions are as illustrated in FIG. 5A through FIG. 5F. FIG. 5A through FIG. 5F correspond to the characteristics of the Rf signals for the different pit depths and track positions, and plot multiple curves for the different pit diameters. FIG. 5A through FIG. 5F, as in FIG. 3A through FIG. 3F, illustrate the respective cases in which the pit diameters are 0.230 µm, 0.207 µm, 0.184 µm, 0.161 µm, 0.138 µm, 0.115 µm, 0.092 µm, and 0.069 µm in the descending order of Rf signal amplitude.

The levels at the center of the track of the respective curves in FIG. 5A through FIG. 5F correspond to FIG. 4. The Rf signal reaches a minimum with the pit depth of 0.066 µm (approximately $\lambda/4n$), and the pit diameter of 0.230 µm.

Figure 6A:
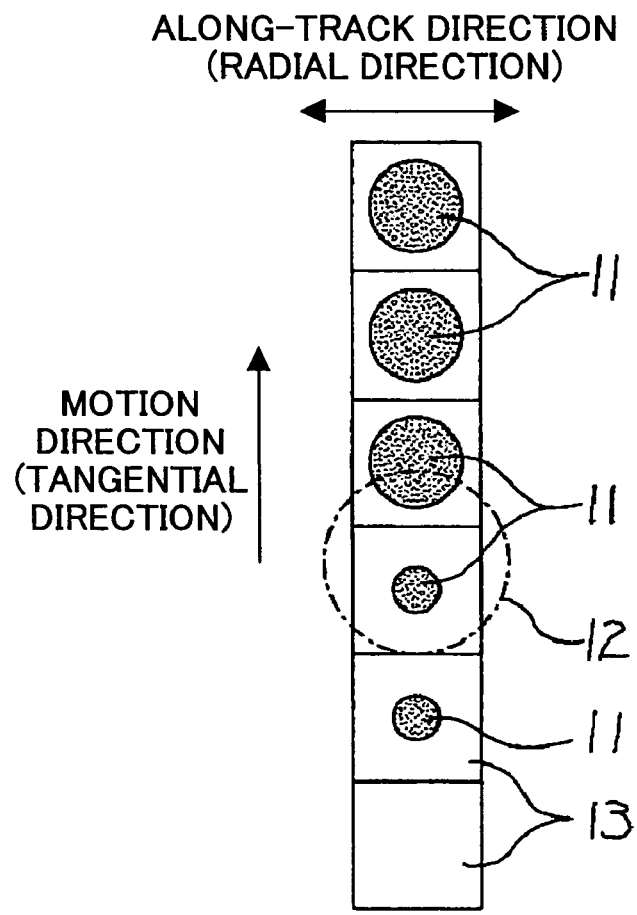
FIG. 6A is a schematic explanatory drawing which illustrates a beam spot in relative motion over pits.
Figure 6B:
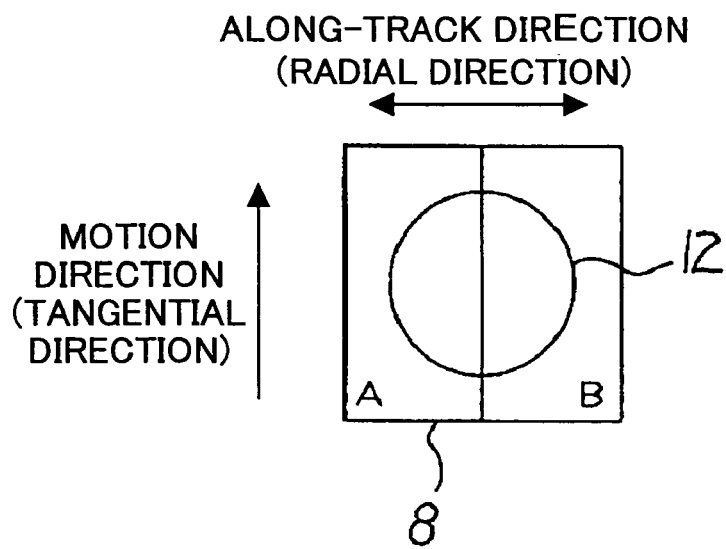
FIG. 6B is a schematic explanatory drawing which illustrates guiding a beam of light reflected to an optical detector.
Figure 7:
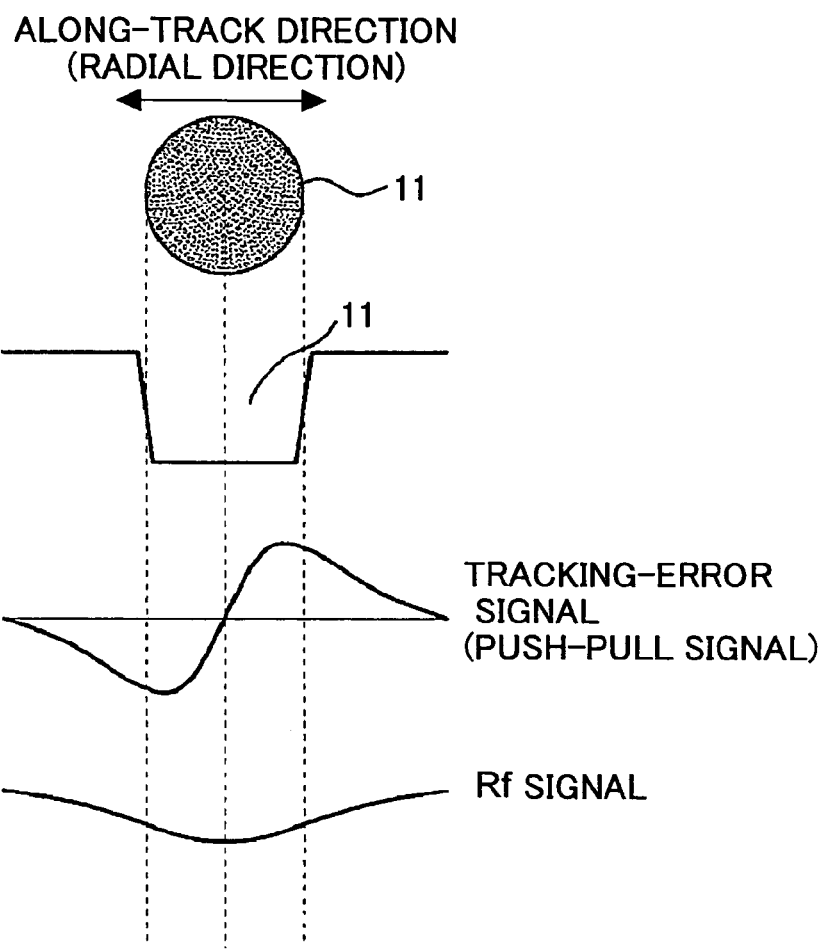
FIG. 7 is a schematic explanatory drawing which illustrates the appearing of a push-pull signal and a Rf signal.

Next, the push-pull signal and the Rf signal are described, referring to FIG. 6 and FIG. 7. FIG. 6A illustrates a beam spot 12 in relative motion over pits 11, while FIG. 6B illustrates the beam spot 12 of reflected light, guided to an optical detector 8 comprising receiving optical areas A and B symmetrically dual-partitioned in a radial direction. In other words, the optical detector 8 comprises the partitioned receiving optical areas A and B as at least a pair of a first receiving optical section arranged in the radial direction of the optical recording medium 4 within an area in far-field in which a zeroth-order reflected light and ± first-order diffracted lights overlap. Moreover, according to the present embodiment, the pits 11 are especially set to have circular (geometrically circular) patterns having different radii depending upon area modulation, so that one of the pits is comprised, per equally-partitioned area referred to as a cell 13, in the central position of the area.

The push-pull signal, TE1, and the reproduced signal, Rf, which are tracking-error signals, may be obtained by computations below using detected signals a and b at the partitioned receiving optical areas A and B:

$$TE1=(a-b)/(a+b)$$

$$Rf=(a+b)/(a+b)$$

Herein, an appearing of the push-pull signal and the Rf signal as illustrated in FIG. 3 and FIG. 5 is described, referring to FIG. 7. The Rf signal is a summed signal of the amount of light returned to the partitioned receiving optical areas A and B when the beam spot 12 illuminates the optical recording medium 4. When the beam spot 12 is positioned over the pits 11, as light is affected by diffraction at the pits 11 so that the amount of light returned to the partitioned receiving optical areas A and B (or, the amount of light reflected) decreases, the Rf signal level decreases. On the other hand, when the beam spot 12 illuminates the optical recording medium 4, the push-pull signal indicates an unbalance of the amount of light reflected in a radial direction of the pits 11. As the beam spot 12 approaches edges of the pits 11, the direction of the diffraction of light biases to a longitudinal direction of the pits 11, the biased direction differing depending on whether the edges precede or follow the pits 11 so that as the difference between outputs a and b of the partitioned receiving optical areas A and B is computed, pulse-shaped signals having different polarities for the preceding and the following edges relative to the pits 11 are obtained.

Referring to FIG. 5, it may be understood that, even for a predetermined pit depth, multiple Rf signal levels may be obtained by changing the pit diameter. In other words, changing the pit diameter enables recording and reproduction of multi-level data. Moreover, referring to FIG. 2 and FIG. 3, it may be understood that, even in an optical recording medium having a smaller pit diameter relative to the beam spot diameter, under a predetermined pit condition, detection of a push-pull signal is enabled. As described above, considering the compatibility with a recording-type optical recording medium comprising a continuous channel-shaped structure, the push-pull method is desired as a method of detecting a tracking-error signal.

As described above, as for the depths of the pits 11, values within the range from $\lambda/6n$, where the maximum for the push-pull signal amplitude is reached to $\lambda/4n$ where the maximum in the differences among the pit sizes in the Rf signal amplitudes is reached, and especially the intermediate values (at around $\lambda/5n$), may be selected. The latter maximum in the differences in the Rf signal amplitudes indicates that the signal-to-noise ratio of the Rf signal reaches the maximum.

Figure 8:
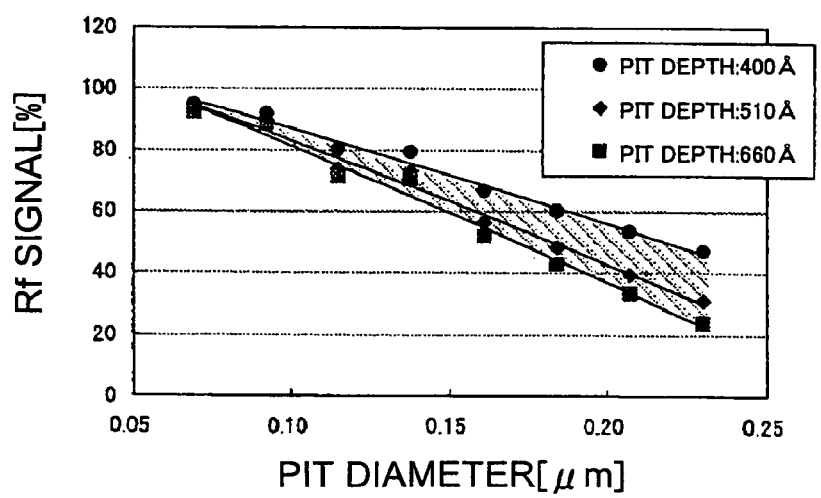
FIG. 8 is a graph which illustrates relationships among the pit diameters (pit occupancy rates), the pit diameters, and the Rf signals.
Figure 9:
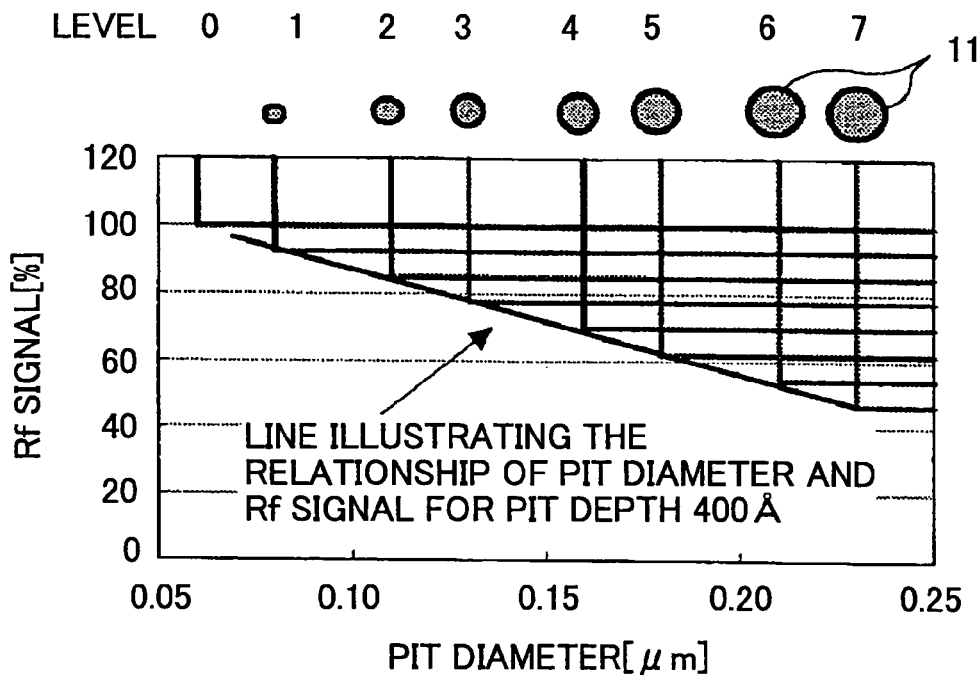
FIG. 9 is an explanatory drawing which illustrates the corresponding Rf signal levels for the respective pit sizes, assuming that the number of pit patterns is 8.

Moreover, the method of reproducing such multi-level recorded data is described. The relationships between the pit diameters (the pit occupancy rates) and the Rf signals are as illustrated in FIG. 8. The difference from FIG. 4 is that the horizontal axis is represented by the pit diameter and, especially herein, the pit depth is set to be $\lambda/6n$. The Rf signal level changes depending upon the occupancy rate of the pits 11 in one cell 13. When pits 11 do not exist, the Rf signal reaches the maximum level, while it reaches the minimum level when the occupancy rate of the pits 11 reaches a maximum. Using such relationships, in FIG. 9, the Rf signal levels corresponding to the respective pit sizes are illustrated in a case that the number of pit patterns (the number of multiple levels is 8 (levels 0 through 7). Adopted patterns of the pits 11 are illustrated in an upper portion of FIG. 9.

In other words, in a case where the reproduced signals having multiple levels dependent upon the pit occupancy rates for the cells 13 are generated, the pits 11 comprise (N−1), or 7 different pit diameters based on the area modulation, the seven different pit diameters being set so as to approximately equally divide into eight parts the difference in the amount of light reflected from the cell 13 in a case of the pits 11 comprising a maximum pit diameter (in which Rf signal level is minimal) and the amount of light reflected from the cell 13 in a case in which pits 11 do not exist (in which Rf signal level is maximal.) Therefore, according to the present embodiment, the reproduction-type optical recording medium is produced by partitioning the area comprising the pits 11 into the cells 13 having equal areas so as to comprise per cell 13 one of the pits 11, which is area-modulated, in which reproduced signals having multiple levels dependent upon the pit occupancy rates for the cells 13 are generated. Multi-level information is recorded not by depth modulation, but rather by area modulation so that, in such a manufacturing process, a stable developing process of exposing the glass board and a provision of a reproduction-type optical recording medium, in which multi-level information is recorded, with an ease in production is obtained. Moreover, a setting of pit depths within the range from $\lambda/6n$ where the push-pull signal amplitude is maximal to $\lambda/4n$ where the amplitude differences among the pit sizes of the reproduced signals are maximal, or in other words, the signal-to-noise ratio of the reproduced signal is maximal, especially the intermediate values in the range, enables detecting the tracking-error signal based on the push-pull method generally used in a recording-type optical recording medium. In other words, in a case where reproduced information is recorded per cell using the pit occupancy rates, the result is that an arranging of the pits lined up continuously is observed equivalently by the beam spot 12 as an arranging of channels comprised continuously, enabling achieving compatibility with the generating of the tracking-error signal of the recording-type optical recording medium. In such case, as there is no need to observe the edges between the pits in the motion direction of the beam spot 12, the problem of the DPD method as well as such problems as the optical efficiency and cross-erasing are resolved.

Figure 16:
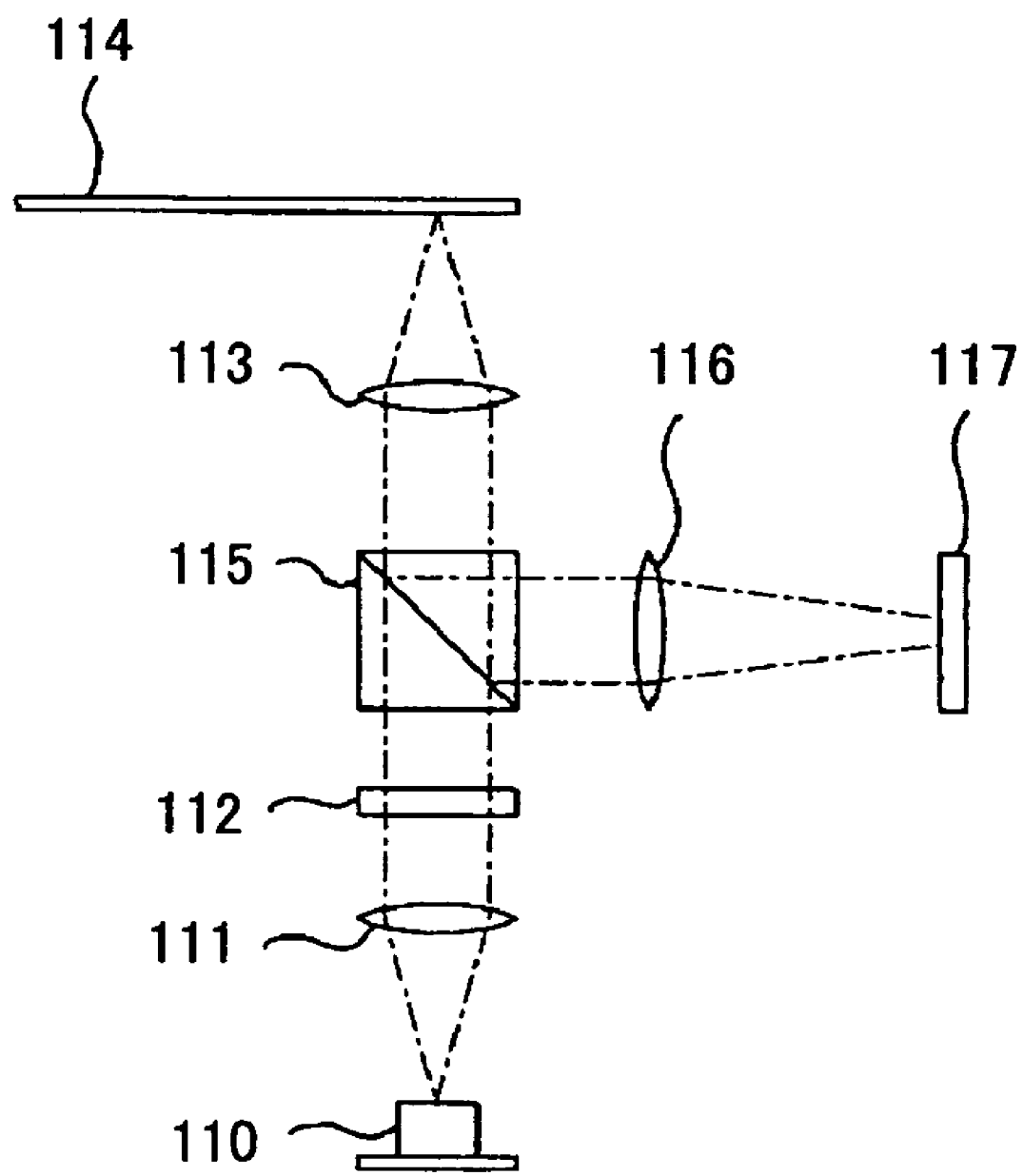
FIG. 16 is a schematic diagram which illustrates an optical pickup apparatus so as to describe a related-art DPP method and the second embodiment of the present invention.
Figure 17:
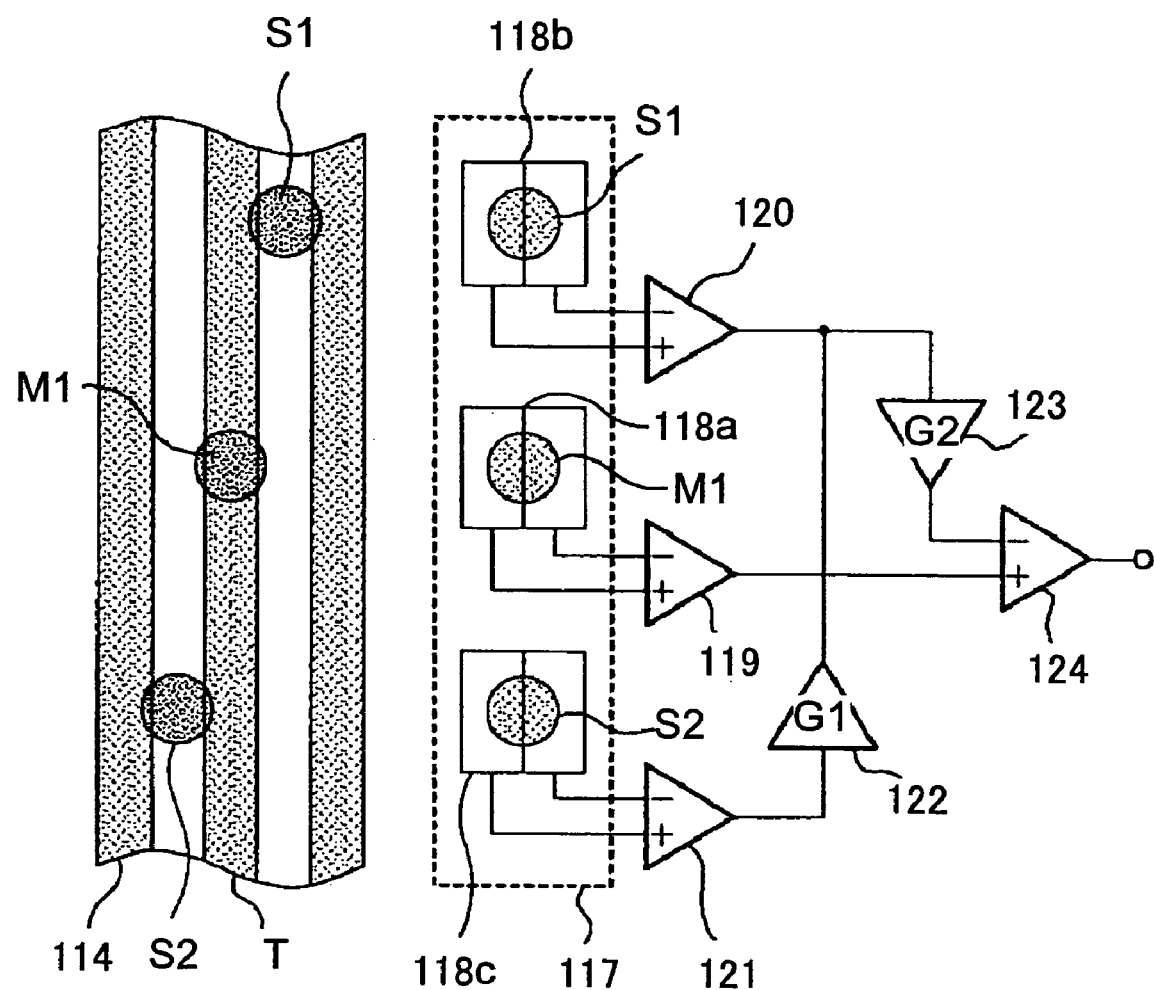
FIG. 17 is a schematic diagram which illustrates a detecting optical system in the optical pickup apparatus as illustrated in FIG. 16.
Figure 18A:
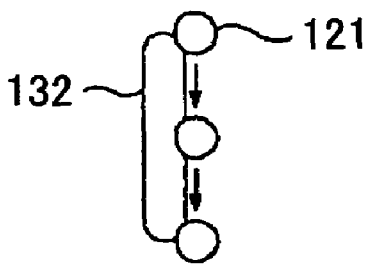
FIG. 18A and FIG. 18B are explanatory drawings which illustrate a beam spot and optical receiving states so as to describe a related-art DPD method.
Figure 18B:
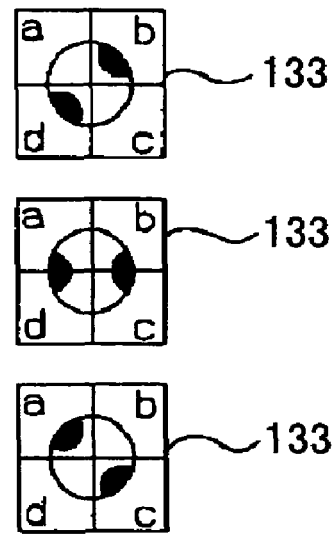
Figure 19A:
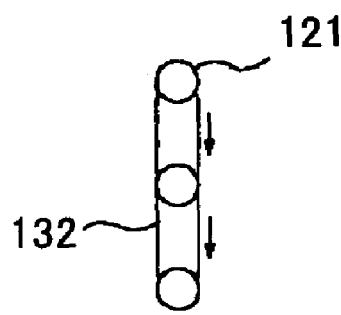
FIG. 19A and FIG. 19B are explanatory drawings which further illustrate the beam spot and the optical receiving states so as to describe the related-art DPD method.
Figure 19B:
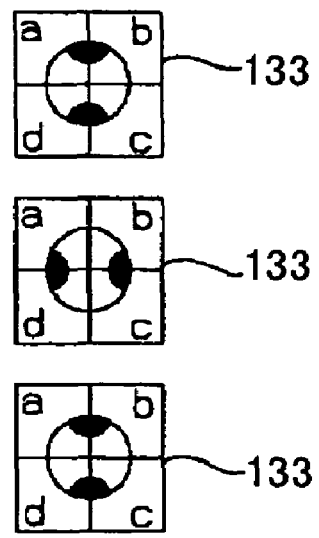

A second embodiment according to the present invention is described using FIG. 16 and FIG. 17.

The present embodiment relates to generating a tracking-error signal for the reproduction-type optical recording medium 4 as described above, and a configuration of a receiving optical system and signal-processing system different from the first embodiment. In other words, while, in a case of using a simple push-pull method as described above, there is a problem in which an offset is generated in a tracking-error signal due to an imbalance in the distribution of light on a surface of the optical receiving section when an optical axis of an object lens 2 shifts (a shift) or tilts (a tilt) from an optical axis of a fixed optical system. The present embodiment enables resolving such a problem by using a generally-known differential push-pull method.

The differential push-pull method (the DPP method) generates a tracking-error signal by comprising, in an optical recording medium using a grating, on a main track and on a neighboring track of an optical recording medium, a main beam M1 spot and first and the second sub-beam S1 and S2 spots.

Referring to FIG. 16 which illustrates an optical pickup (an optical element of an optical information processing apparatus) adopting a grating, an output beam from a semiconductor laser 110 is collimated at a collimating lens 111 so as to be diffracted at a grating 112 to be branched into a zeroth diffracted light and ± first diffracted lights. Then, such branched lights are, at an object lens 113, as illustrated in FIG. 17, condensed to illuminate an optical recording medium 114. Then, the main beam M1 spot which is the zeroth diffracted light is formed over a main track T of the optical recording medium 114, while the first sub-beam S1 spot and second sub-beam S2 spot, which are ± first-order diffracted lights, respectively, precedes and follows, respectively, the main beam M1 spot, formed in a radial direction of the optical recording medium 114 with a distance of a ½ track pitch apart.

The main beam M1 and the first and second sub-beams S1 and S2 reflected at the optical recording medium 114 so as to pass through the object lens 113 are deflected from illuminating light at a beam splitter 115 so as to be received at receiving optics 117 via a detecting lens 116. The receiving optics 117, as illustrated in FIG. 17, comprises a first optical detector 118a which optically receives the main beam M1 and second and third optical detectors 118b and 118c which respectively optically receive the first and second sub-beams S and S2. Such first through third optical detectors 118a through 118c comprise plates, dual-partitioned in the radial direction of the optical recording medium 114, the plates independently performing photoelectrically converting.

The signals detected at the first through third optical detectors 118a, 118b, and 118c are input to the first through third differential amplifiers 119, 120, and 121, respectively, so as to be output as the first through third push-pull signals. The first amplifier 122 amplifies the third push-pull signal to a predetermined gain G1, while the second amplifier 123 amplifies a signal summing a signal output from the first amplifier 122 and the second push-pull signal to a predetermined gain G2. The fourth differential amplifier 124 takes the difference between a signal input from the second amplifier 123 and the first push-pull signal, based on the main beam M1, input from the first differential amplifier 119 so as to be output as a tracking-error signal. Then, the gains G1 and G2 of the first and second amplifiers 122 and 123 are determined, taking into account the intensities of the main beam M1 and the sub-beams S1 and S2. Thus, even in a case where the object lens 2 is shifted in the radial direction of the optical recording medium 4, a push-pull signal (a tracking-error signal) which includes almost no push-pull offsets is obtained.

Figure 10:
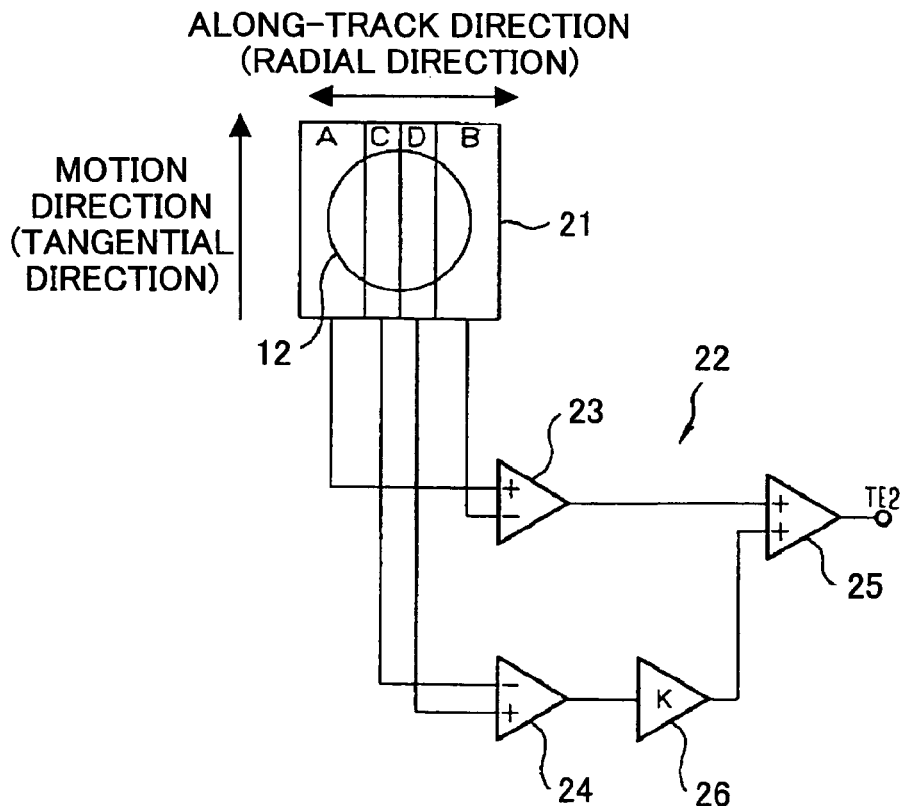
FIG. 10 is a block diagram which illustrates receiving optics with a partitioned structure and a signal processor, according to a third embodiment of the present invention.

A third embodiment according to the present invention is described, referring to FIG. 10 and FIG. 11. The portions which are the same as the portions illustrated in the first embodiment are illustrated using the same numerals, and their explanations are abbreviated (and treated the same in the embodiments below).

The present embodiment relates to a generating a tracking-error signal for the reproduction-type optical recording medium 4 as described above, the configurations of the receiving optical system and the signal processing system being different from the first and the second embodiments. In other words, in a case of using a simple push-pull method as in the first embodiment, there is a problem of generating an offset to a tracking-error signal due to an imbalance in the distribution of light on the surface of an optical receiving section when an optical axis of an object lens 2 shifts (a shift) from an optical axis of a fixed optical system or tilts (a tilt). On the other hand, in a case of using the DPP method as in the second embodiment, as a beam output from the optical source 110 is used by being diffracted and branching into three beams M1, S1, and S2 at a grating 112, (1) optical efficiency of the main beam M1 decreases so that use in recording or applying to an increased speed becomes difficult, (2) there is a problem in that, at the time of the recording, the recorded signals at neighboring tracks are erased by the first and second sub-beams S1 and S2. On the other hand, according to the present embodiment, such problems are solved by using a compensation-type push-pull method as described, for example, in Patent Document 4.

Therefore receiving optical system 9 comprises, as an optical detector, receiving optics 21 having a structure quad-partitioned in a radial direction, as illustrated in FIG. 10. The receiving optics 21 comprises four receiving optical areas A, B, C, and D, having as a first receiving optical section a pair of the receiving optical areas A and B arranged symmetrically relative to the radial direction of an optical recording medium 4 within an area in a far-field in which a zeroth-order light and ± first-order diffracted lights reflected from the pits 11 overlap with one another and as a second receiving optical section a pair of the receiving optical areas C and D arranged symmetrically relative to the radial direction of the optical recording medium 4 within the area in the far-field with only the zeroth-order light reflected from the pit 11. Assuming signals detected at the receiving optical areas A through D as a through d, a signal processing section 22 performs signal processing based on such detected signals a through d so as to detect such signals as tracking-error signals. The signal processing section 22 comprises a differential amplifier 23 which obtains a difference signal from the signals detected a and b at the pair of the receiving optical areas A and B as the first receiving optical section, a differential amplifier 24 which obtains a difference signal of the signals detected c and d at the pair of the receiving optical areas C and D as the second receiving optical section, an adder 25 which adds the results of computing at the differential amplifiers 23 and 24, and a gain-adjusting unit 26, arranged between the differential amplifier 24 and the adder 25, variably controlling a gain K as means for correcting so as to amplify or decrease the output of the differential amplifier 24.

Hereby, a tracking-error signal TE2 in the case of the present embodiment is obtained according to an equation below:

$$TE2=[(a-b)+K(c-d)]/[(a+b)+K(c+d)]$$

Hereby, adjusting the gain K of the gain adjusting unit 26 so as to minimize a push-pull offset included in such compensation-type push-pull signal TE2 as described above enables the obtaining of a push-pull signal (a tracking-error signal) TE2 which contains almost no push-pull offsets.

The point as described above is explained in detail, referring to FIG. 11. First, FIG. 11 illustrate signals detected, using an optical source 1 which outputs a beam with a wavelength λ of 400 nm and an object lens with a NA of 0.65, emitting a beam illuminating pits 11 having pit depths of λ/6n and pit diameters of 0.23 μm in an optical recording medium 4 having a track pitch of 0.43 μm so as to optically receive the reflected light. Herein, while FIG. 11B illustrates a tracking-error signal TE1 using a generally-used push-pull method, a larger push-pull offset is generated by a radial shift in the object lens 2 as illustrated by a solid line and, as the amount of shift in the radial direction of the object lens 2 becomes larger (towards the right-hand side of the x-axis), such amount of the push-pull offset increases.

Figure 11A:
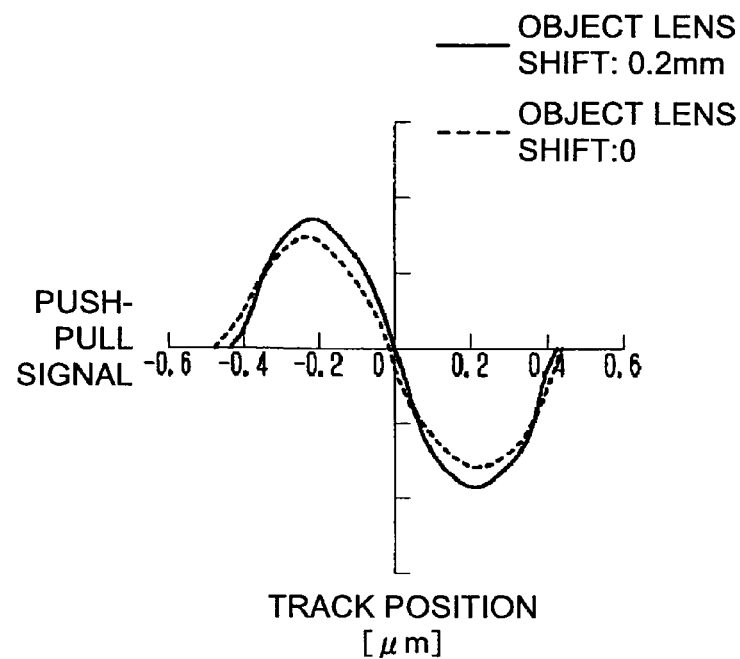
FIG. 11A is a graph of push-pull signals indicating a presence or an absence of an effect of an object-lens shift, according to methods in embodiments of the present invention.
Figure 11B:
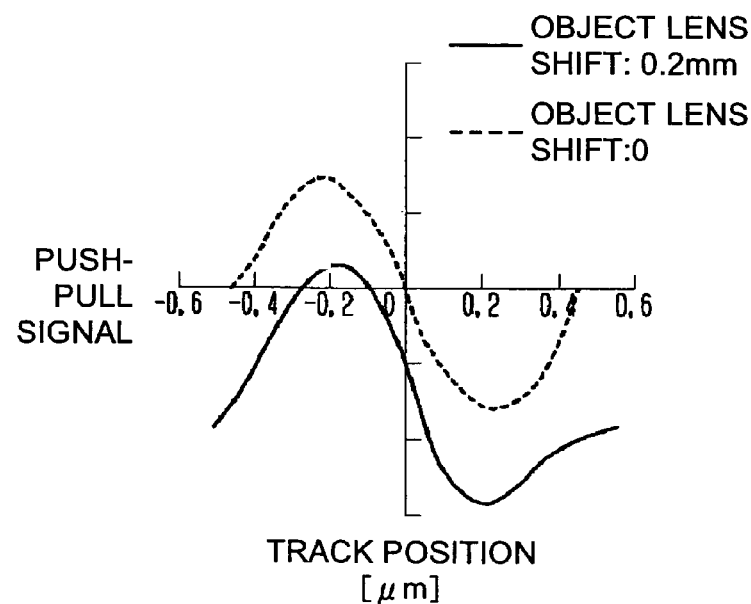
FIG. 11B is a graph of push-pull signals indicating a presence or an absence of an effect of an object lens shift, according to a related-art method.

On the other hand, FIG. 11A, illustrates that applying the compensation-type push-pull method enables detecting a tracking-error signal TE2 with almost no push-pull offsets even in a case of the object lens 2 being shifted in the radial direction. In other words, even in a case of the configuration as illustrated in FIG. 10, (a–b) and (c–d), comprising the push-pull signal as in the tracking-error signal TE1, include considerable push-pull offsets so that, with an increase in the amount of shift in the object lens 2, the amounts of the push-pull offsets increase. However, multiplying by the gain K at the gain-adjusting unit 26 of the push-pull signal (c–d) so as to add to the push-pull signal (a–b) at the adder 25 enables, as illustrated in FIG. 12, detecting a tracking-error signal TE2 which contains almost no push-pull offsets relative to the shift in the radial direction of the object lens 2.

Incidentally, the method of generating the compensation-type tracking-error signal TE2 according to the present invention may be applied not only to the reproduction-type optical recording medium 4 according to the present invention as described above, but also to the recording-type optical recording medium (comprising compatibility), wherein guiding channels (grooves) run continuously on an information-recording surface of a recording-type optical recording medium, the surface being coated with such materials as a phase-changing material so as to make different reflectances. Thus, in a case of including as targets a recording-type optical recording medium with the continuously-running grooves, in addition to the reproduction-type optical recording medium, switching to adjust a predetermined gain K, depending upon whether it is a reproduction-type optical recording medium or a recording-type optical recording medium, enables generating a tracking-error signal suitable for the characteristics of the respective optical recording media.

Moreover, in cases of applying the pit structure comprising the multi-level information not only throughout the surface but also partially (a ROM area comprising the pits), and, furthermore, in a case of including as targets a hybrid-type optical recording medium also having a RAM area with continuously-running grooves, switching to adjust a predetermined gain K depending upon whether it is the ROM area or the RAM area enables generating a tracking-error signal suitable for the characteristics of the respective areas.

Figure 12:
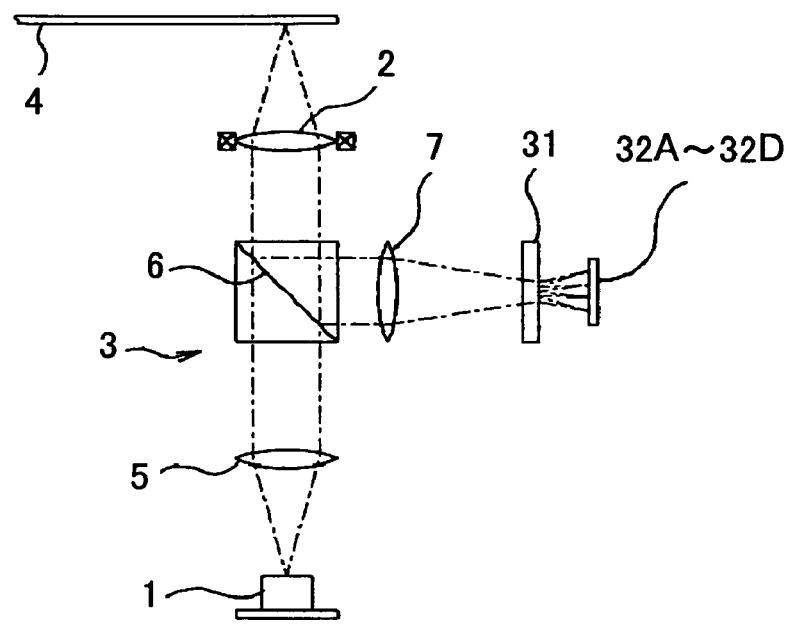
FIG. 12 is a schematic block diagram which illustrates an optical pickup apparatus according to a fourth embodiment of the present invention.
Figure 13:
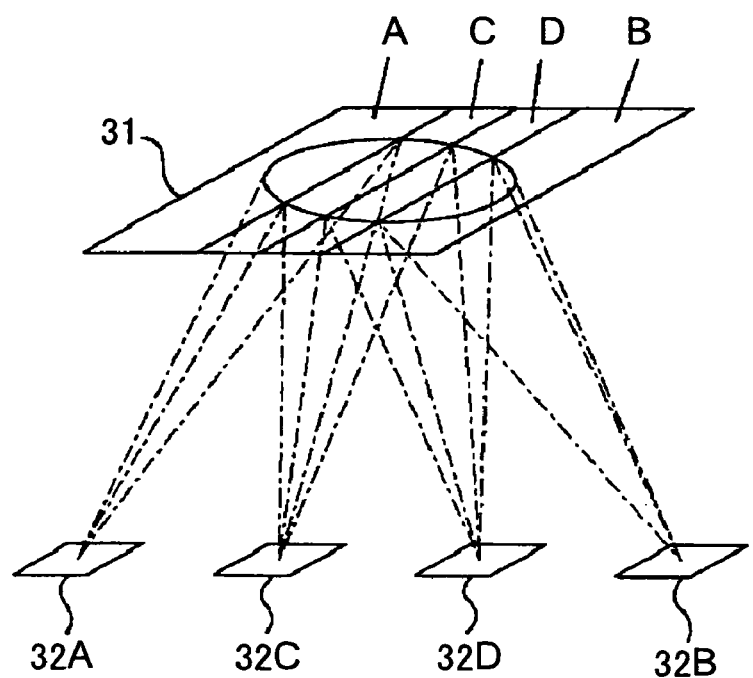
FIG. 13 is a schematic diagram which illustrates a combination of a hologram and receiving optics.
Figure 14:
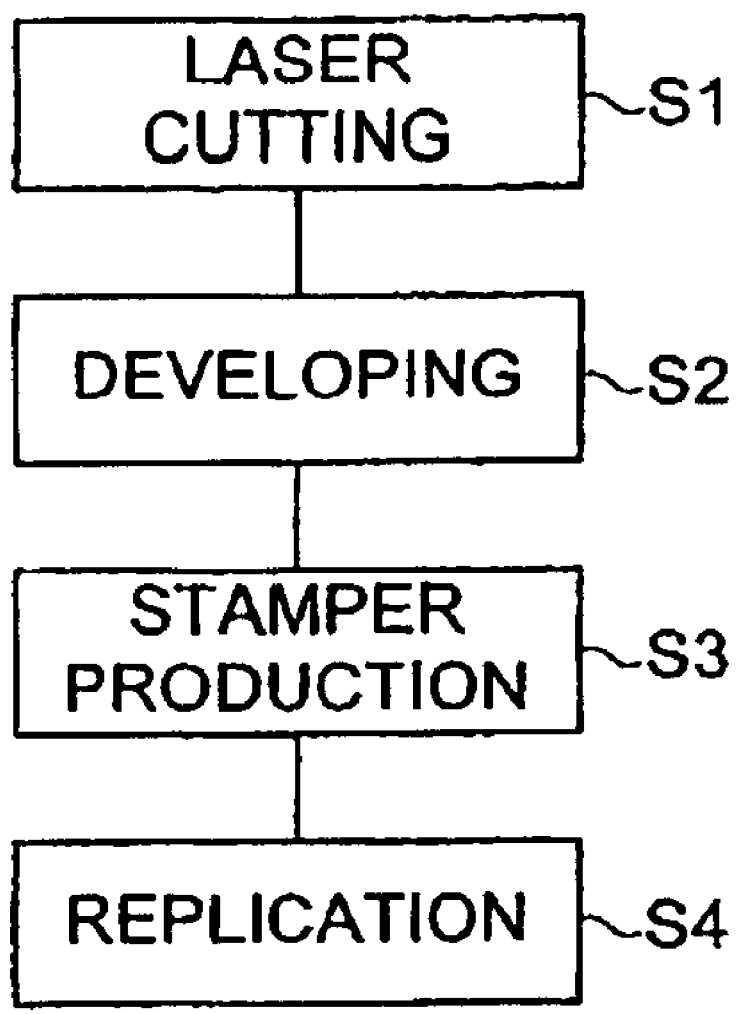
FIG. 14 is a flowchart which illustrates a manufacturing process of a reproduction-type optical recording medium, according to the related-art.
Figure 15A:
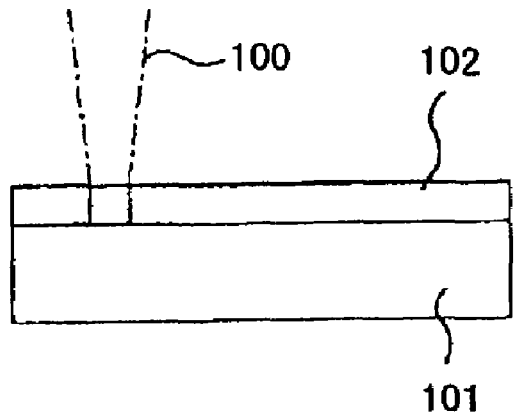
FIGS. 15A-D are schematic cross-sectional diagrams which illustrate specifics of the manufacturing process as illustrated in FIG. 14.
Figure 15B:
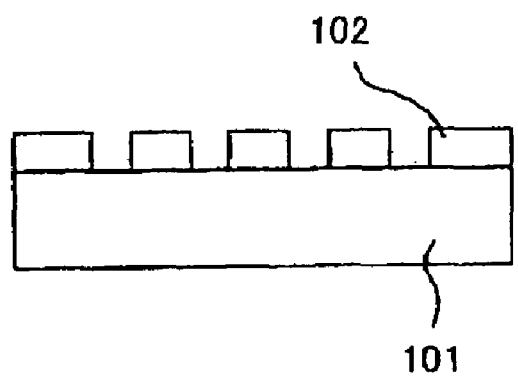
Figure 15C:
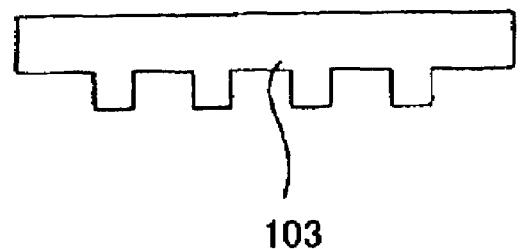
Figure 15D:
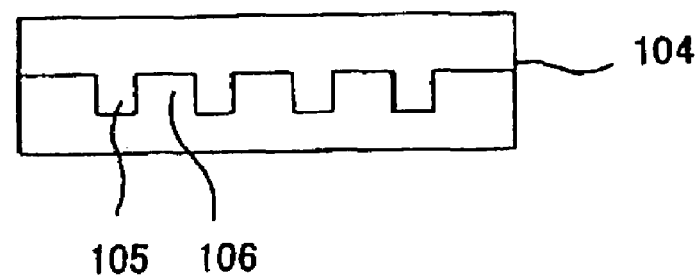

A fourth embodiment according to the present invention is described using FIG. 12 and FIG. 13. While the present embodiment basically is the same as the third embodiment, applying a compensation-type push-pull method, a receiving optical system 9 uses, in lieu of receiving optics 21, a configuration combining a hologram (a diffracting device) 31 with multiple receiving optics 32A through 32D.

First, the hologram 31, as in the case of the receiving optics 21, comprises four diffracting areas A, B, C, and D quad-partitioned in a radial direction, comprising a pair of the diffracting areas A and B comprising hologram patterns, arranged symmetrically relative to the radial direction of an optical recording medium 4. First-order input light is diffracted at different angles, within an area in a far-field in which a zeroth-order light reflected and the ± first-order diffracting lights reflected from the pits 11 overlap. A pair of diffracting areas C and D comprise hologram patterns, arranged symmetrically relative to the radial direction of the optical recording medium 4, so as to first-order diffract input light at different angles, within the area in the far-field with only the zeroth-order light reflected from the pits 11. Then, a combination of receiving optics 32A and 32B arranged at the positions of optically receiving the deflected light diffracted by the diffracting areas A and B comprises a first receiving optical section while a combination of receiving optics 32C and 32D arranged at the positions of receiving the deflected light diffracted by the diffracting areas C and D comprises a second receiving optical section.

In the case of the present embodiment, the hologram 31 is comprised within the receiving optical system 9 and the signals detected a through d at the receiving optics 32A through 32D are the same as in the case of the signals detected a through d by the receiving optics 21, so details are abbreviated. A configuration, which is the same as the signal processing section 22 as illustrated in FIG. 10, enables generating a tracking-error signal TE2 so as to minimize the push-pull offset.

Therefore, in the case of the present embodiment, as in the case of the third embodiment, generating a tracking-error signal TE2 not affected by a push-pull offset is enabled. Arranging a hologram 31 having a partitioned structure at former stages of the receiving optics 32A through 32D so as to diffract reflected light in the far-field in the direction of the receiving optics 32A through 32D enables enhanced flexibility in the configuration and the arrangement of the receiving optics 32A through 32D.

The present application is based on the Japanese Priority Application No. 2003-339564 filed on Sep. 30, 2003, the entire contents of which are hereby incorporated by reference.

The invention claimed is:

1. A medium for optical recording, from which recorded information is reproduced by a laser beam, comprising:
a disk board having a recording surface; and
a plurality of pits in the recording surface, wherein each of said pits is comprised in a corresponding one of a plurality of cells each cell having equal size and varying pit-occupancy rates dependent on the recorded information, said pit-occupancy rate being the ratio of area of said pit to area of said cell corresponding to said pit, wherein depths H of said pits, a wavelength λ of the laser beam, and a refractive index n of said board are related as: $\lambda/6n < H < \lambda/4n$, signals having a plurality of levels of N, N being dependent on the pit-occupancy rate, are generated, and said pits comprising (N−1) different pit diameters, the (N−1) pit diameters being set so as to almost equally divide into N parts the difference between amount of light reflected from the cells in a case of pits with pit diameters having maximum values and amount of light reflected from the cells in a case of no pits existing.

2. The medium for optical recording as claimed in claim 1, wherein modulation is 60% or above, said modulation being a ratio of a signal level corresponding to the maximum of said different (N−1) pit diameters to a signal level corresponding to the minimum of said different (N−1) pit diameters.

* * * * *